P. L. TENNEY.
ROTARY VALVE.
APPLICATION FILED AUG. 24, 1910.
994,620.
Patented June 6, 1911.
2 SHEETS—SHEET 2.
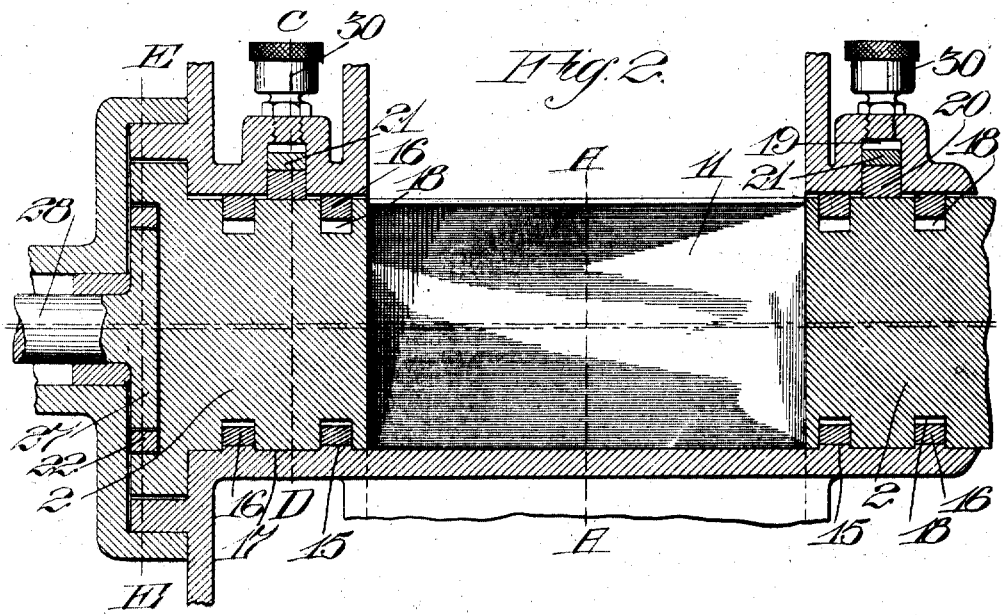
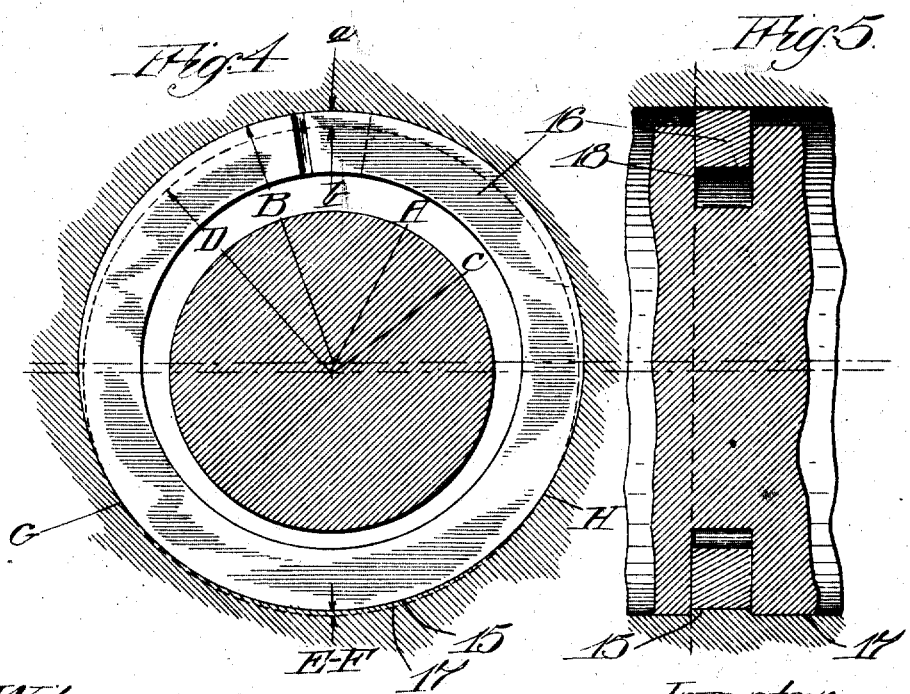
Witnesses
Thos. Castberg
J. E. Chapman
Inventor
Perry L. Tenney
by G. H. Strong
his atty.

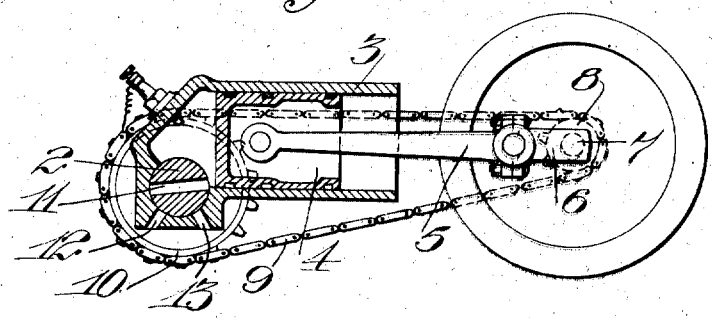
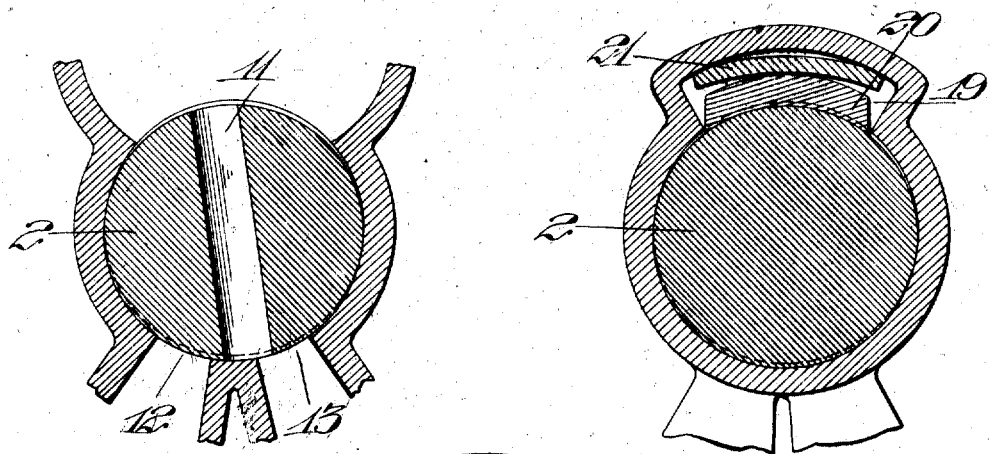
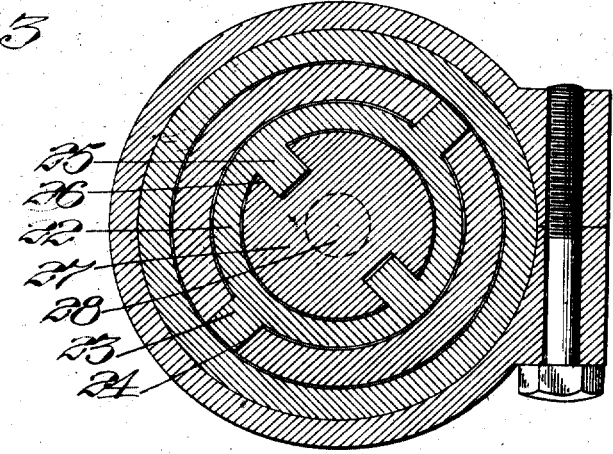

UNITED STATES PATENT OFFICE.

PERRY L. TENNEY, OF ALAMEDA, CALIFORNIA, ASSIGNOR OF ONE-HALF TO WILLIAM M. LATHAM, OF ALAMEDA, CALIFORNIA.

ROTARY VALVE.

994,620.

Specification of Letters Patent.

Patented June 6, 1911.

Application filed August 24, 1910. Serial No. 578,731.

*To all whom it may concern:*

Be it known that I, PERRY L. TENNEY, citizen of the United States, residing at Alameda, in the county of Alameda and State of California, have invented new and useful Improvements in Rotary Valves, of which the following is a specification.

This invention pertains to valves, and particularly pertains to rotary valves for gas engines.

The object of the invention is to provide a durable, efficient and practical rotary valve for internal combustion engines, and especially to provide a valve structure embodying features of the design and arrangement whereby the "freezing" of the valve is positively prevented.

The invention consists of the parts and the construction and combination of parts as hereinafter more fully described and claimed, having reference to the accompanying drawings, in which—

Figure 1 is a side elevation of the engine with the valve applied. Fig. 2 is a longitudinal section through the valve and its seat. Fig. 3 is a section on line A—A of Fig. 2 of the valve. Figs. 4 and 5 are sections showing the eccentric relation of the ring seat, valve and the valve seat. Fig. 6 is a section on line C D Fig. 2. Fig. 7 is a section on line E—E of Fig. 2 showing the coupling.

Much difficulty has heretofore been encountered in making an internal combustion engine with rotary valves so that the valves will not bind by expansion and contraction due to the extremes of heat and cold. I have built and successfully operated an engine of this class involving a valve designed to revolve continuously in one direction, and which will not bind in its seat under pressure, or become jammed by expansion due to heat, or in other words, it will not "freeze."

The illustrations show one form of my invention in which a valve 2, is mounted horizontally at or near one end of the engine cylinder 3, in which reciprocates a piston 4 connected by a pitman rod 5 to the usual crank 6, whereby the engine shaft 7 is driven. Secured to the engine shaft 7 is a gear 8 by which power is transmitted through suitable connections, as chain 9, to an appropriately proportioned gear 10, connected to the valve 2. The ratios existing between the gears 8 and 10 is, in this instance, four to one and the valve is shown in the closed position, and the piston at the rearmost end of its stroke at the instant of an explosion in the casing of the engine. The valve 2, Figs. 2–3, is shown as having a port 11, which in its cycle successively opens an exhaust port 12 in the casing of the engine and thence passes and communicates with an inlet port 13, through which a charge of gas is drawn into the engine as the piston 4 moves outwardly in the casing.

The important features involved in my invention is in the peculiar construction of the valve and of its seats in the casing whereby the valve is properly seated so as to turn easily and is also prevented from being jammed or pinched by its expansion within its seat in the casing, and the means for holding the valve section. To this end the engine casing is first bored to a diameter represented by the narrow annular ledges 15, Fig. 2, which ledges later, as will be seen, form a series of seats 15 in the casing for the snap-rings 16. The center of this first bore is A Fig. 4 and its radius A B. The valve 2 is of slightly less radius than A B.

In order to seat the valve properly and prevent it, when expanded, from binding in its bearings, the casing 2 is bored or otherwise formed, as by grinding, using a grinding tool of the shape and size of the actual valve to be used; and by employing emery the valve seat is ground down or dished until the valve seat is worn an amount represented approximately by E F Fig. 4. This grinding provides a semi-cylindrical seat 17, eccentric to the ring seats 15, but of a diameter equal to the diameter of the body or cylindrical portion of the valve 2. The center of the valve is represented by C Fig. 4 and its radius is equal to C D or C F.

Preferably, the center C, Fig. 4, upon which the seat 17 for the valve 2 is formed in the engine, is lower than the center A, upon which the packing ring seats 15 are formed. The two bores or seats 15 and 17 are eccentric to one another; the two bores, whose centers are A C, intersecting each other at G H. This results in an elongation of the valve chamber equal to E F, Fig. 4, so that the valve can expand without pinching. The valve when being assembled is passed into the bore of the valve seat with its axis practically coinciding with or above the center A of the larger bore of the ring seat until the packing rings 16, which have previously been assembled in annular grooves 18 formed in the body of valve 2, are in registration with their respective and several ledges or seats 15. The valve is then allowed to rest upon its own eccentric seats 17 in the engine casing. The valve thus has a play upward represented by the crescent space between D B Fig. 4, which space in practice is about $\frac{1}{4}$ of an inch, which will vary in different engines. This structure and arrangement provides against the escape of gases under pressure by means of the peripheral contact of the packing rings 16 with their seats 15 and also by the face contact of these several rings with the walls of the slots 18 of the valve, so that while there is actual space between the top half of the surface of the valve and the adjacent walls of the casing no possible leakage occurs past the packing rings 16. On the other hand as the packing rings do not necessarily revolve coincidentally with the valve 2, the latter may turn freely upon its seats 17.

The formation of a valve case of two diameters with the relatively eccentric seats 15 and 17 is important in that seat 15 forms a bearing for the rings 16 and seat 17 supports the valve 2, and the ample clearance produced by the large bore forming the continuous upper wall of the seat 15 allows for the relative expansion of the body of the valve 2 when this becomes heated due to the operation of the engine; and since the valve in itself is not depended upon to act as a packing against loss of pressure this prevention resides entirely in the function of several packing rings and the valve is free to revolve on its axis and on the seat 17. The valve always has a fluid-tight running joint with its seat.

When the engine is in operation the clearance between the upper surface of the valve and the upper surface of the ring seat 15, permits the free expansion of the valve, so that this cannot possibly become jammed or frozen in its seat. For the purpose of preventing the valve from rattling or moving too freely I insert, in pockets 19 in the casing and adjacent to each end of the valve 2, bearing shoes 20, having a face curved to conform with and bearing upon the surface of the valve and upon these shoes and between the walls of pockets in the casing are interposed suitable springs 21 having the function of constantly pressing the valve upon its seat and also preventing chattering of the valve. These spring shoes 20 are put in their pockets before the valve is put in.

Manifestly any appropriate form of coupling may be made between the driving gear 10 and the valve 2, but I have found that a particularly successful and practical form of coupling resides in the use of an intermediate coupler or gimbal ring 22 having projecting lugs 23 resting in diametrically opposite notches 24 in one end of the rotary valve 2. Other projections 25, set at an angle of 90 degrees to the projections 23, are formed on the interior of the gimbal ring 22, and register with notches 26 formed in a flange or head 27 of a shaft 28 upon which the gear 10 is mounted. In this manner the shaft 28 is connected to drive the rotary valve 2 by means of the floating coupler ring 22 so that the absolute alinement of the shaft or stem 28 and valve is not necessary; a considerable amount of independent movement may occur either to the shaft 28 or to the valve without in any way being transmitted to the other. By "rotary valve" I include in my invention manifestly an oscillatory valve.

In multiple cylinder engines, one continuous valve would be extended through the engine, and the several and distinct ports made at the correct angle to properly time the opening and closing of the exhausts and intakes of the several cylinders.

The application of suitable oil-cups 30 and the formation of an oil seal by delivering the oil to the pockets 19 and filling the crescent-space $a$-$b$ between each pair of rings 16, afford an effective seal against the escape of gas.

Having thus described my invention, what I claim and desire to secure by Letters Patent is—

1. The combination of a casing, a valve mounted therein, said casing having a chamber for the valve slightly elongated transversely thereof, to form a valve seat of two diameters, one diameter corresponding with that of the valve, the other diameter being slightly larger, and means co-acting with the valve and its seat to form a fluid-tight running joint.

2. The combination of a rotary valve having a casing, the valve chamber in the casing being slightly elongated transversely of the valve, said elongation effected by two intersecting bores, the valve seating in one of said bores and expandible into the other, and means for forming a fluid tight joint between the valve and its seat.

3. The combination of a rotary valve and its seat, the seat formed by two intersecting bores, the valve resting in one bore, inwardly projecting ledges in the seat concentric with the other bore, and snap-rings mounted in the valve and seating on said ledges.

4. The combination of a rotary valve and its seat, the seat formed by two intersecting bores, the valve resting in one bore, inwardly projecting ledges in the seat concentric with the other bore, snap-rings carried by the valve and seating on said ledges, a valve stem, and a universal connection between the valve stem and the valve.

5. The combination of a rotary valve and its seat, the seat formed by two intersecting bores, the valve resting in one bore, inwardly projecting ledges in the seat concentric with the other bore, snap-rings carried by the valve and seating on said ledges, and a valve stem having a notched head fitting a gimbal ring, said gimbal ring fitting an end of the valve.

6. The combination of a valve casing and a rotary valve having a transversely elongated valve seat, said valve carrying spaced snap-rings fitting up-raised annular ledges on the valve seat, the portion of the valved casing opposite the point of contact of the valve with its seat having one or more pockets in which are housed bearing shoes to maintain the valve closely seated.

7. The combination of a valve casing and a rotary valve having a transversely elongated valve seat, said valve carrying snap-rings at its ends fitting up-raised annular ledges on the valve seat, the portion of the valved casing opposite the point of contact of the valve with its seat having one or more pockets in which are housed bearing shoes to maintain the valve closely seated, and springs within the pockets acting on said bearing shoes to press them against the valve.

8. The combination of a rotary valve and its seat, the seat formed by two intersecting bores, the valve resting in one bore, inwardly projecting ledges in the seat concentric with the other bore, snap-rings mounted in the valve and seating on said ledges, and means for supplying oil between each pair of snap-rings.

In testimony whereof I have hereunto set my hand in the presence of two subscribing witnesses.

PERRY L. TENNEY.

Witnesses:
FREDERICK E. MAYNARD,
CHARLES EDELMAN.